United States Patent [19]
Clark

[11] 3,866,285
[45] Feb. 18, 1975

[54] METHOD OF CONSTRUCTING A SOLAR ENERGY COLLECTOR

[75] Inventor: Harold A. Clark, Midland, Mich.

[73] Assignee: Dow Corning Corporation, Midland, Mich.

[22] Filed: Mar. 1, 1974

[21] Appl. No.: 447,191

[52] U.S. Cl.............. 29/157 R, 29/527.1, 126/271, 264/219
[51] Int. Cl............................................ B23p 17/00
[58] Field of Search........... 126/271; 29/157 R, 469, 29/527.1; 264/219, 259, DIG. 64

[56] References Cited
UNITED STATES PATENTS

| | | | |
|---|---|---|---|
| 1,047,554 | 12/1912 | Nichols | 126/271 |
| 2,992,545 | 7/1961 | Walker | 126/271 UX |
| 3,010,153 | 11/1961 | Bittner | 264/219 |
| 3,039,453 | 6/1962 | Andrassy | 126/271 |
| 3,236,294 | 2/1966 | Thomason | 165/48 |
| 3,487,134 | 12/1969 | Burr | 264/219 X |

*Primary Examiner*—C. W. Lanham
*Assistant Examiner*—D. C. Reiley, III
*Attorney, Agent, or Firm*—Howard W. Hermann

[57] ABSTRACT

A solar energy collector having a body of foamed plastic and a surface configuration of generally semicylindrical recesses in closely spaced parallel relationship, the surface of said recesses being covered with reflective or absorptive foil to reflect or transmit solar energy to receiving devices such a fluid conduits or solar cells. The collector is made by laying a plurality of half-pipes into a frame, covering them with foil, pouring curable foam plastic over the pipes and removing the composite from the pipes. The receiving devices are then mounted in the recesses and interconnected.

5 Claims, 4 Drawing Figures

PATENTED FEB 18 1975  3,866,285

METHOD OF CONSTRUCTING A SOLAR ENERGY COLLECTOR

BACKGROUND OF THE INVENTION

The present invention relates to solar energy collectors and particularly to a method of constructing a lighweight, inexpensive solar collector.

It is well known that the sun's radiation can be collected as a source of energy for heating or cooling or for direct conversion to electricity. Heating and cooling depend upon collection of rays of solar energy in a fluid heat transfer system. The heated fluid then being pumped or allowed to flow to a place or utilization of the thermal energy it has acquired. In an analogous manner solar cells collect radiation from the sun and convert the radiant energy directly into electricity which can then be transmitted to a place of utilization.

In certain areas of the world, solar energy is the most abundant form of available energy if it could be harnessed economically. Even in more developed areas of the world the economical harnessing of solar energy would provide an attractive alternative to use of fossil fuels for energy generation. While many systems have been proposed for collecting and converting solar energy, the biggest deterrent to wide spread use is probably the expense of systems which have thus far been devised. It is toward this problem that the present invention is directed.

SUMMARY OF THE INVENTION

It is accordingly a primary object of the present invention to provide an inexpensive solar collector for use with either fluid heat exhanger or solar cell systems. In accordance with this and other objects there is provided a method which includes, first, providing a flat base. A plurality of generally semicylindrical male mold portions are then laid over the base in closely spaced parallel relationship. In its simplest form these male mold portions can be simply metallic or plastic pipes sawed in half. A frame is placed around the male mold portions and extends upwardly from the base. The male mold portions are then covered with a layer of foil and a curable foam plastic mix is poured into the frame over the foil and cured. This results in a composite of foam with foil adhered to the surface thereof which composite can be removed from the male mold portions and is extremely lighweight. Solar energy receiving devices such as fluid carrying pipes or solar cells or both are mounted within the recesses of the composites and covers provided as desired to form the completed solar collector device. Arrays of panels formed in this manner may be interconnected as desired by simply laying panels on the ground side-by-side and interconnecting them. The system is cheap and efficient and is adapted on-site construction for large arrays or easy transport of finished panels because of lightness of weight.

BRIEF DESCRIPTION OF THE DRAWINGS

Other objects and advantages of the present invention will become apparent to those skilled in the art from a study of the following description and the accompanying drawings which are merely illustrative of the present invention. In the drawings.

DESCRIPTION OF PREFERRED EMBODIMENTS

Figure 1:
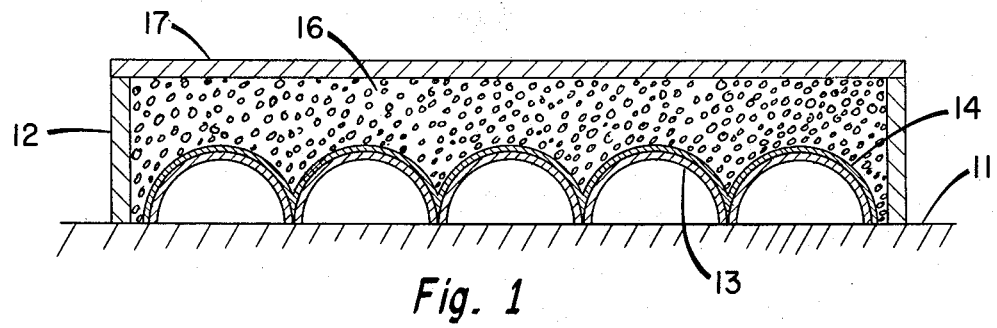
FIG. 1 is a vertical cross-sectional view illustrating the method of making a preferred embodiment of the invention.

Referring now to the drawings wherein like reference characters are used to designate like or corresponding parts throughout the figures thereof there is shown in FIG. 1 a base 11 which may simply be a level piece of ground, a block of concrete or a sheet of plywood, for example. A frame 12, preferably of rectangular configuration, extends upwardly from the base 11. The frame 12 may be, for example, wood, metal, or plastic. There are laid on the base 11 a plurality of generally semicylindrical male mold portions 13 in closely spaced parallel relationship. In their simplest form these mold portions may be metallic or plastic pipe which is simply sawed in half axially. The pipe, for example, can have an external diameter of 2 to 6 inches.

There is now placed on top of the male mold portions a layer of foil 14 which may be either a metallized reflective plastic foil such as polyester film or a polished or light absorbent metallic foil such as aluminum or stainless steel. The foil is made to conform to the surface of the mold portions by tucking it into the crevices between adjacent mold portions. Desirably the foil is protected by a thin film of clear silicone resin on the surface which is put on the side facing the mold portions.

Now a plastic mix, formulated to obtain the desired weight per cubic foot which may be, for example, in the 1-15 pound per cubic foot range, is poured over the whole assembly and allowed to foam and cure. Syntactic foams, of course, can also be used and would not require foaming. Suitable foams are commercially available and are made from phenolic, polyester or polyurethane resins, for example. In accordance with a Technical Service Bulletin distributed by Union Carbide Corporation a rigid phenolic foam having a density of 1.9 pounds per cubic foot can be prepared by mixing 100 parts Bakelite Phenolic Resin BRL-2760 with 1 part Union Carbide L-5340 Silicone Surfactant, 15 parts each of Boric and oxalic acids, and 16 parts UCON-113 Fluorocarbon propellant. Other formulations are in commercial use. Virtually any rigid foam material capable of withstanding temperatures generated in use of the device can be used satisfactorily. It is preferred that the thermal conductivity for the cured foam be less than 0.25 BTU/hr./ft$^2$/°F/inch.

The surface of the foam is trimmed off, if necessary, level with the top of the frame 12. The foam is shown in the drawings by the numeral 16. If protection of the foam backing is desired, a layer of plastic, metallic foil, or rigid base material 17 can be cemented on the top surface of the foam and frame. The composite is now lifted from the male mold portions 13 and turned over. The foil 14 is, of course, laminated to the foam 16 by virtue of having been in contact with the foam during curing, and does not adhere to the male mold portions.

Figure 2:
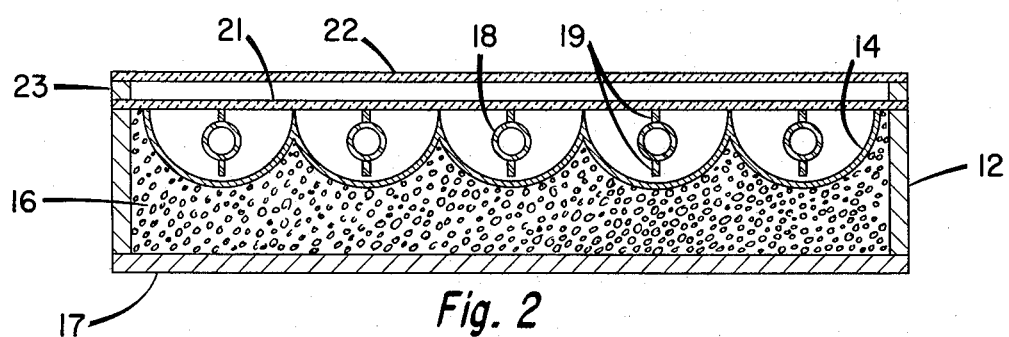
FIG. 2 is a view in vertical cross-section of a preferred embodiment of the invention made according to the method illustrated in FIG. 1.

The resulting composite can be seen in FIG. 2 in which a plurality of pipes 18 which serve as solar energy receiving devices have been mounted within the recesses in the composite which were formed by the male mold portions. The pipes should be colored or coated for maximum absorption of heat. If desired, the pipes 18 may have metallic fins 19 extending vertically therefrom to aid in collecting solar energy reflected by the metallic foil 14 supported on the foam 16. The frame 12 is preferably left on the panel and used to support the pipes 18. It also serves to protect the edges of the foam 16 from damage. If desired, however, it can be removed. A pair of glass sheets 21 and 22, separated by blocks 23 are preferably placed over the panel to protect and insulate it. The inner panel 21 can be extremely thin and lighweight if it is supported on the high points of the configuration as shown. This arrangement has the added advantage that convection is eliminated in arrays which are tipped at an angle to the horizontal. In a preferred embodiment the spacing between the glass sheets is maintained at about ⅜ inch.

Figure 3:
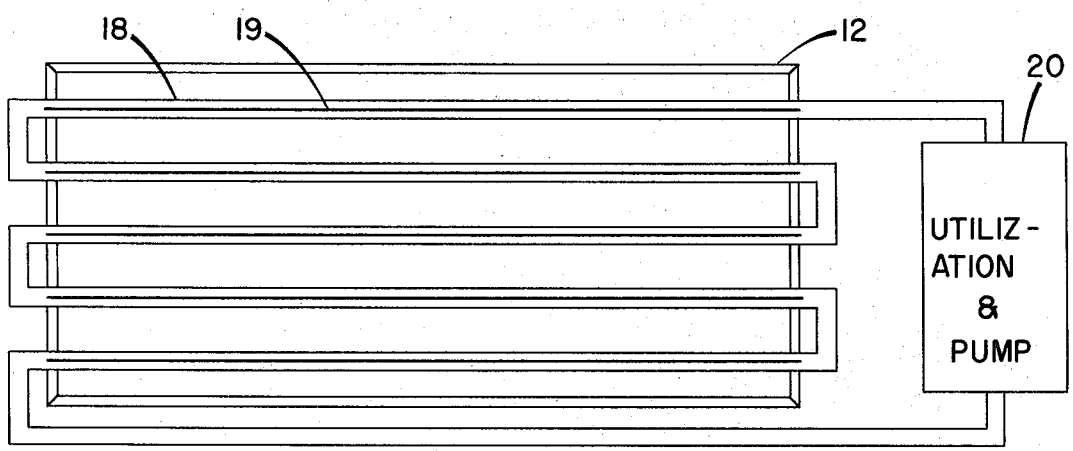
FIG. 3 is a top plan view of a heat exchanger type application of the present invention, shown partly diagrammically.

In FIG. 3 there is shown a top plan view showing diagrammically the interconnection of pipes 18 and the connection of the array of pipes with the utilization device and a circulating pump 20. The utilization device may be, in its simplest form, a radiator in a dwelling. Alternatively, it can be any other means of extracting the thermal energy carried by fluid in the pipes 18 which in turn was derived from solar radiation impinging upon the reflective foil 14 and the exterior of the pipes 18 and fins 19. While the system of FIG. 3 shows only a single panel interconnected in series obviously an array of panels may be interconnected with one another and the pipes 18 may be connected in either series or parallel relationship as desired for maximum efficiency in the particular application in which the solar collector is to be used. The panels, due to their low density, are extremely low in weight and are cheap and simple to manufacuture. If desired, they can be manufactured on site but due to their lightness can be easily transported. Arrays of virtually any size can be made by placing panels side-by-side and/or end-to-end on the ground or in any elevated configuration desired.

Figure 4:
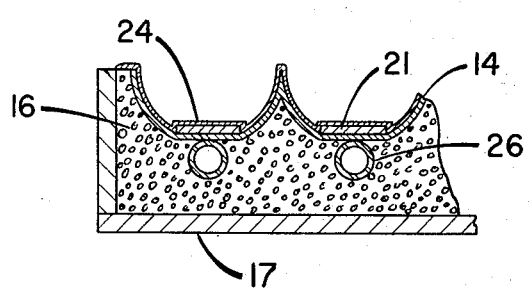
FIG. 4 is a fragmented vertical cross-section of a modification of the embodiment shown in FIGS. 2 and 3 in which solar cells are utilized as the solar energy receiving devices.

While the device as described so far can be efficiently utilized with heat exchanger type solar energy collection devices it is similarly applicable to use with solar cells or with combined solar cell heat exchanger collection devices provided that the collection device is properly designed in parabolic form to direct rays onto the solar cell. A modified configuration showing both is shown in FIG. 4. In the configuration shown in FIG. 4 the shape of the recesses is slightly modified to have a flat bottom and to reflect impinging rays toward the bottom. The device of FIG. 4 is made similarly to the method described in connection with FIG. 1 except that the male mold portions, of course, must conform to the slightly modified configuration. After removal of the composite from the mold portions a plurality of solar cells 24 are mounted on the flat portions in the recesses and suitably electrically connected. For dual purpose a plurality of fluid conduits 26 can be installed in the frame 12 prior to pouring the curable foam plastic mix 16 into the frame whereby the fluid conduits 26 are buried in the composite. The fluid conduits are preferably in intimate contact with the foil 14 which under such conditions is preferably a totally metallic foil rather than a metallized plastic foil. The fluid conduits 26 serve two purposes. First, they serve to cool the solar cells 24 to keep them from damage and this cooling is aided by direct conduction of thermal energy by the metallic foil to the conduit 26 which is, of course, also preferably metal. Secondly, the heat picked up by fluid in the conduits 26 can be utilized in a manner similar to that shown in the configuration of FIG. 3. The solar cells 24 are preferably mounted with a silicone adhesive and the final assembly is preferably coated with a thin film of transparent silicone resin. With this protection it is not necessary to cover the assembly and efficiency of both solar energy collection and cooling results. Obviously, if desired, additional fluid conduit pipes 18 can be installed in combination with solar cells 24 to get additional efficiency from the unit.

A further modification of the device, which is not shown specifically in the drawings, is the elimination of the pipes 18 in FIG. 2 and use of light absorbent black surface on the foil. The foil should be thermally conductive and therefore is preferably metallic. Heat conducting fluid such as water is merely flowed over the surface of the foil to absorb heat therefrom and collected for utilization of the heat obtained in a manner similar to that described in U.S. Pat. No. 3,236,294, granted Feb. 22, 1966, for example.

Obviously, many other modifications and variations of the present invention will occur to those skilled in the art from a reading of the foregoing. Accordingly, within the scope of the appended claims the invention may be practiced otherwise than as specifically described.

That which is claimed is:

1. A method for manufacturing a solar energy collector comprising:
   providing a flat base,
   laying over said base a plurality of generally semicylindrical male mold portions in closely spaced parallel relationship,
   placing a frame around said mold portions and extending upwardly from said base,
   covering said male mold portions with a layer of foil shaped in conformity therewith,
   pouring a curable foam plastic mix into said frame over said foil and curing said plastic mix,
   removing the resultant composite of frame, plastic and foil from said male mold portions and base, and
   providing solar energy receiving means within the recesses in said composite which were formed by said male mold portions.

2. A method as defined in claim 1 and further including the step of adhering a backing sheet to the cured plastic foam.

3. A method as defined in claim 1 wherein providing said solar energy receiving means includes mounting pipes extending longitudinally through said recesses at approximately the focal points thereof.

4. A method as defined in claim 1 wherein providing said solar energy receiving means includes mounting solar cells in the bottoms of said recesses.

5. A method as defined in claim 1 wherein providing said solar energy receiving means includes flowing heat absorptive liquid across the surfaces of said recesses.

* * * * *